(No Model.)

M. J. HEWLETT.
CAR COUPLING.

No. 360,693. Patented Apr. 5, 1887.

Witnesses
L. F. Gardner
E. P. Ellis

Inventor
M. J. Hewlett,
per F. A. Lehmann,
atty.

UNITED STATES PATENT OFFICE.

MADDRA JACKSON HEWLETT, OF CUMBERLAND CITY, TENNESSEE.

CAR-COUPLING.

SPECIFICATION forming part of Letters Patent No. 360,693, dated April 5, 1887.

Application filed January 28, 1887. Serial No. 225,814. (No model.)

*To all whom it may concern:*

Be it known that I, MADDRA JACKSON HEWLETT, of Cumberland City, in the county of Stewart and State of Tennessee, have invented certain new and useful Improvements in Car-Couplings; and I do hereby declare the following to be a full, clear, and exact description of the invention, such as will enable others skilled in the art to which it pertains to make and use it, reference being had to the accompanying drawings, which form part of this specification.

My invention relates to an improvement in automatic car-couplings; and it consists in the combination of the draw-head having a suitable recess formed in its top, a pivoted coupling device, for engaging with the link, a shaft which passes through the draw-head and coupling device and which is provided with a suitable recess in its outer end, and a pivoted weight which is fastened in this recess, by means of which weight the coupling device is held so as to either couple or not couple, as may be desired.

The object of my invention is to provide an automatic coupler in which the coupling device is held in any desired position by means of a weight, which weight is attached to the outer end of the shaft upon which the coupling device is placed, and which shaft extends out beyond the side of the car, so as to be readily operated without having the brakeman go between the cars in coupling them, and thus endanger both life and limb.

Figure 1:
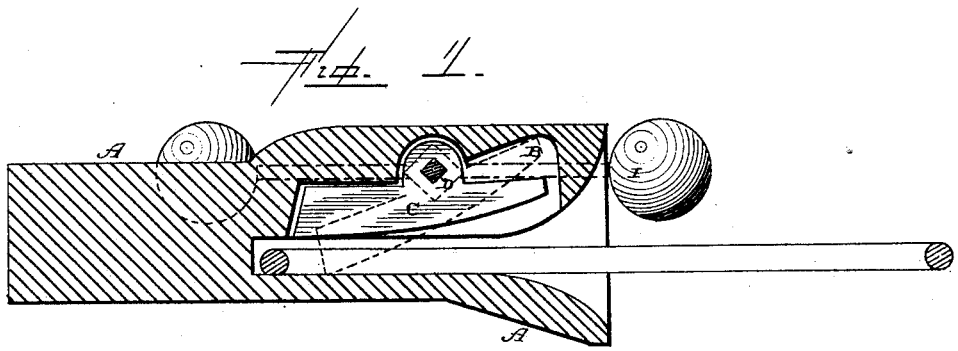
Figure 2:
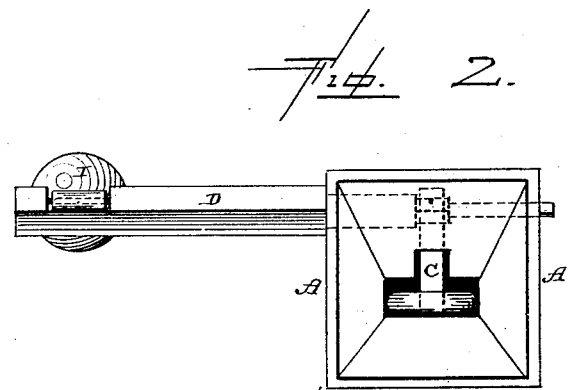
Figure 3:
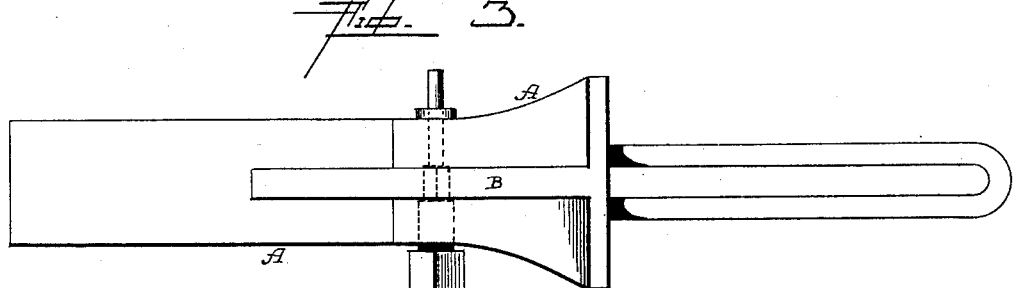

Figure 1 is a longitudinal vertical section taken through the draw-head. Fig. 2 is a front elevation of the same. Fig. 3 is a plan view.

A represents a draw-head, of ordinary construction, and which has a suitably-shaped recess, B, made in its top, so as to receive the coupling device C. Passing horizontally through the coupling device C is the rod or shaft D, which is square at that portion where it passes through the coupling device, so as to cause the device to turn with the rod in all its movements. This rod is secured at its inner end, so that it cannot be drawn out through the head, by means of a collar, which is passed over the reduced end of the rod and fastened by a set-screw. This rod will be made long enough to project out to or near the edge of the car, so as to be readily operated by hand in coupling or uncoupling the cars, and thus prevent all necessity of the brakeman having to risk life or limb by going between the cars when they run together to couple. The inner end of the coupling device C, when depressed, strikes against the lower side of the opening in the draw-head, so as to prevent the link from becoming uncoupled; but when this inner end is raised the outer end of the coupling device never falls below the recess in which it is held, so as to interfere with the incoming end of the link.

In the outer end of the operating-rod is formed a suitable recess, and in this recess is pivoted a weighted lever or rod, I. This weight or lever serves to hold the operating-rod positively either in one position, so that the cars will not couple when they run together, or so that the cars will automatically couple, as may be desired. When this weighted rod or lever is turned forward, its gravity holds the operating-rod in such a position that the rear of the coupling device is raised in the recess B in such a manner that it will not engage with the link when the cars run together. When, however, this weighted rod or lever is turned backward from the direction of the advancing car, the rear end of this coupling device C is held in a lowered position; but it will allow the link to pass under its bottom and couple. In this case the shaft or rod D is partially turned around by the pressure of the link upon the bottom of the coupling device as the link passes under its bottom, and then the weight returns the device C back to position again, so as to prevent the link from being withdrawn.

The weighted rod or lever can be operated by hand at any time for the purpose of uncoupling the cars. When this rod or lever is turned backward, the coupler becomes automatic in its operation, as before described. The recess in the outer end of the rod or shaft D is so formed that the weight or rod must be thrown either forward or back, as there is no half-way place between them.

The coupling device here shown has more strength and is less liable to break than the old-fashioned pin, as the strain comes laterally upon the device, and because it has a seat in the upper part of the draw-head and also on the bottom. The greater the strain that is brought to bear upon the device the more securely it holds. When the strain is light, the weight attached to the end of the lever will, by its gravity, hold the device in position.

Having thus described my invention, I claim—

The combination of the draw-head having a recess in its top, the coupling device C, placed in the recess, the coupling rod or shaft which passes through the coupling device, and the weighted rod or lever pivoted upon the outer end of the rod, substantially as shown and described.

In testimony whereof I affix my signature in presence of two witnesses.

MADDRA JACKSON HEWLETT.

Witnesses:
J. L. THOMAS,
W. W. PATTERSON.